United States Patent [19]
Alessandro

[11] Patent Number: 5,865,059
[45] Date of Patent: Feb. 2, 1999

[54] NON-CONTACT THICKNESS GAUGE FOR NON-METALLIC MATERIALS IN THE FORM OF FILM, FOIL, TAPE AND THE LIKE

[75] Inventor: Masotti Alessandro, Lesa, Norway

[73] Assignee: Electronic Systems S.P.A., Novara, Italy

[21] Appl. No.: 813,471

[22] Filed: Mar. 7, 1997

[30] Foreign Application Priority Data

Jun. 7, 1996 [IT] Italy .................................. MI96A1162

[51] Int. Cl.⁶ .................................................. G01B 13/06
[52] U.S. Cl. .............................................. 73/159; 33/837
[58] Field of Search .................................. 73/37.7, 1.81, 73/1.71, 1.59, 159; 324/229; 33/732, 837

[56] References Cited

U.S. PATENT DOCUMENTS

| | | |
|---|---|---|
| 3,451,258 | 6/1969 | Westbrook ................................ 73/37.7 |
| 3,854,322 | 12/1974 | Wood et al. . |
| 4,391,127 | 7/1983 | Hawkins ................................... 73/37.7 |
| 5,298,073 | 3/1994 | Wilson ................................ 73/37.7 X |
| 5,355,083 | 10/1994 | George et al. . |

*Primary Examiner*—Joseph L. Felber
*Attorney, Agent, or Firm*—Notaro & Michalos PC

[57] ABSTRACT

The invention relates to a thickness gauge (1) for non metallic materials (4) in the form of foil, film, tape or the like which comprises first non contact measuring means (3), designed to measure the distance of the faced material surface, and second non contact measuring means (5), designed to measure the distance of a metal reference surface (6), said first and second measuring means (3, 5) being installed on one side of a space for receiving the material (4) and operating in two coaxial spatial regions, so that their measurements refer to a same measuring axis (8), wherein the first non contact measuring means (3) is a backscattering fluid sensor.

17 Claims, 8 Drawing Sheets

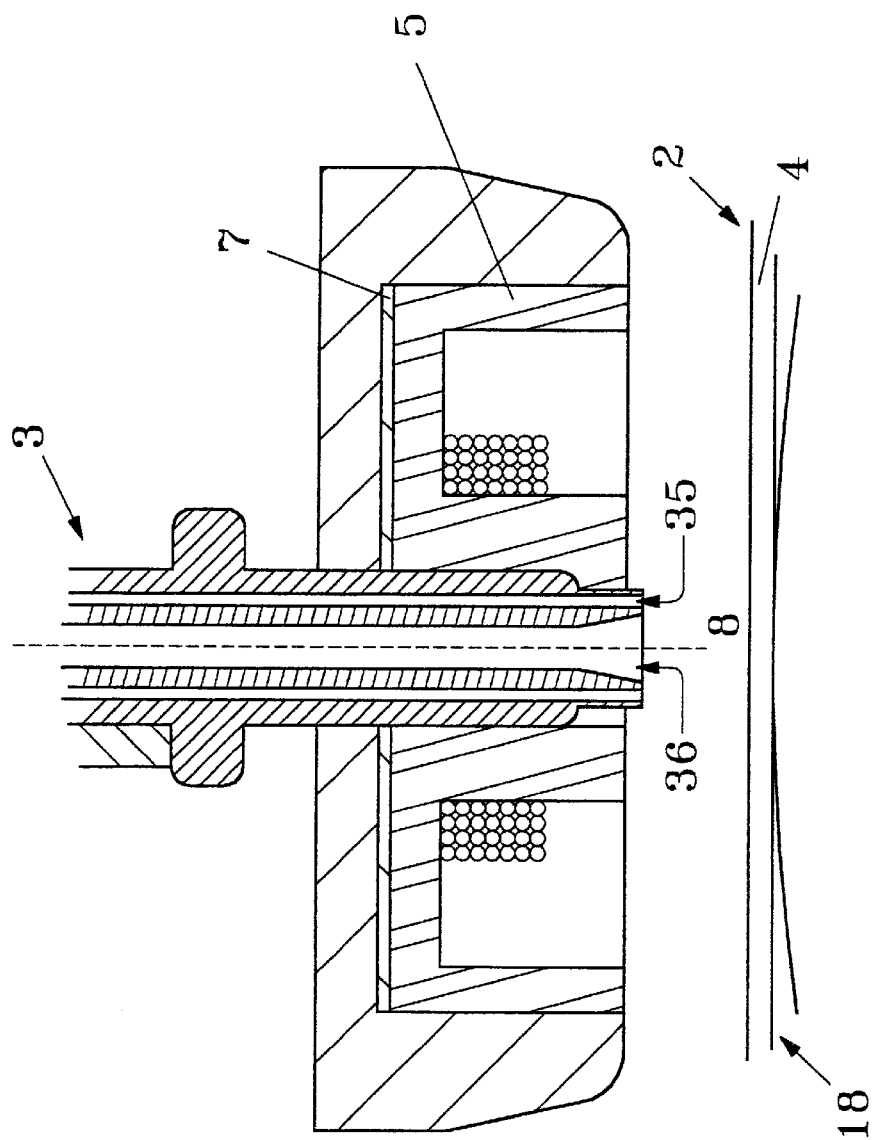

NON-CONTACT THICKNESS GAUGE FOR NON-METALLIC MATERIALS IN THE FORM OF FILM, FOIL, TAPE AND THE LIKE

FIELD AND BACKGROUND OF THE INVENTION

This invention relates to a thickness gauge for non-metallic materials in the form of foil, film, tape or the like.

The thickness of such materials can be measured indirectly by measuring the absorption of a radiation source, or directly by measuring and comparing the distance of the two faces or surfaces of the film. Gauges which directly measure the distance of the film surfaces can perform the measurement either with or without contact.

Document GB 2,217,835A describes a non-contact thickness gauge for measuring the thickness of foil, film and tape made of non-metallic materials.

In particular, it illustrates the combination of a first optical sensor which measures the distance to the upper surface of the film, and a second inductive sensor which measures the distance to a metal reference surface.

The inductive sensor is hollow to allow the housing of the optical sensor, and the two sensors are installed coaxially so that they perform their measurements along the same measuring axis.

While the measurements of the first sensor are performed directly on the measuring axis, those of the second sensor naturally take place on an area surrounding that measuring axis (typically an annulus), so that in practice the second sensor estimates the distance to the metal reference surface along that measuring axis.

In a first disclosed embodiment, the metal reference surface comes into contact with the lower surface of the film.

Since the film moves, the said reference surface is preferably a roller in order to minimise friction.

GB2217835A also describes a second construction in which the metal reference surface is positioned at a distance away from the lower surface of the film, such distance being known as a result of the use of a third, optical sensor.

The above-mentioned thickness gauge presents some drawbacks, however.

Depending on the composition of the material being examined and its surface characteristics, the ratio between the regular reflection factor and the diffuse reflection factor can vary considerably, as can the diffusion indicating curve.

The optical sensors used in thickness gauges designed in accordance with the known technique must therefore be specially constructed on the basis of the optical characteristics of the materials to be measured.

Equally, the optical characteristics of the materials to be measured often present intentional or unintentional dissimilarities which can prejudice the regulation system of the sensor.

In this respect, it should be noted that the speed of the material to be measured relative to the thickness gauge can reach values of around 10 m/sec. By contrast the time constant of the regulator of an optical sensor is measured in tenths of a second, with the result that sudden variations in the optical characteristics of the material overload the regulation circuit of the optical sensor. This makes the measurements performed unreliable because of the adjustment time required by the optical sensor regulator (typically a few tenths of a second). Moreover, the large size of currently known optical sensors means that inductive sensors with a very large diameter have to be used, thus reducing the reliability of the measurements taken.

In fact, the larger the size of the annulus on which the measurement of the inductive sensor is performed, the less precise is the estimated distance of the metal reference surface along the measuring axis.

It should be noted that optical distance sensors have a maximum accuracy of around ±10 $\mu$m, which is not always satisfactory, especially when the average thickness of materials measured is under 1 mm.

In general the non contact thickness gauges currently known for non metallic materials present reliability problems.

SUMMARY OF THE INVENTION

In the light of these drawbacks, this invention offers an improved thickness gauge for non-metallic materials in the form of film, foil, tape and the like.

According to one aspect of this invention, a gauge for measuring the thickness of foil, film, tape and similar materials has been designed.

The invention also relates to a method of measuring the thickness of a foil, film or tape.

Finally a method for calibrating the gauge is provided.

BRIEF DESCRIPTION OF THE DRAWINGS

The invention is described below by way of example, with reference to the accompanying drawings in which:

FIG. 4a is an enlarged cross section view similar to FIG. 4.

DETAILED DESCRIPTION OF THE PREFERRED EMBODIMENT

Figure 1:
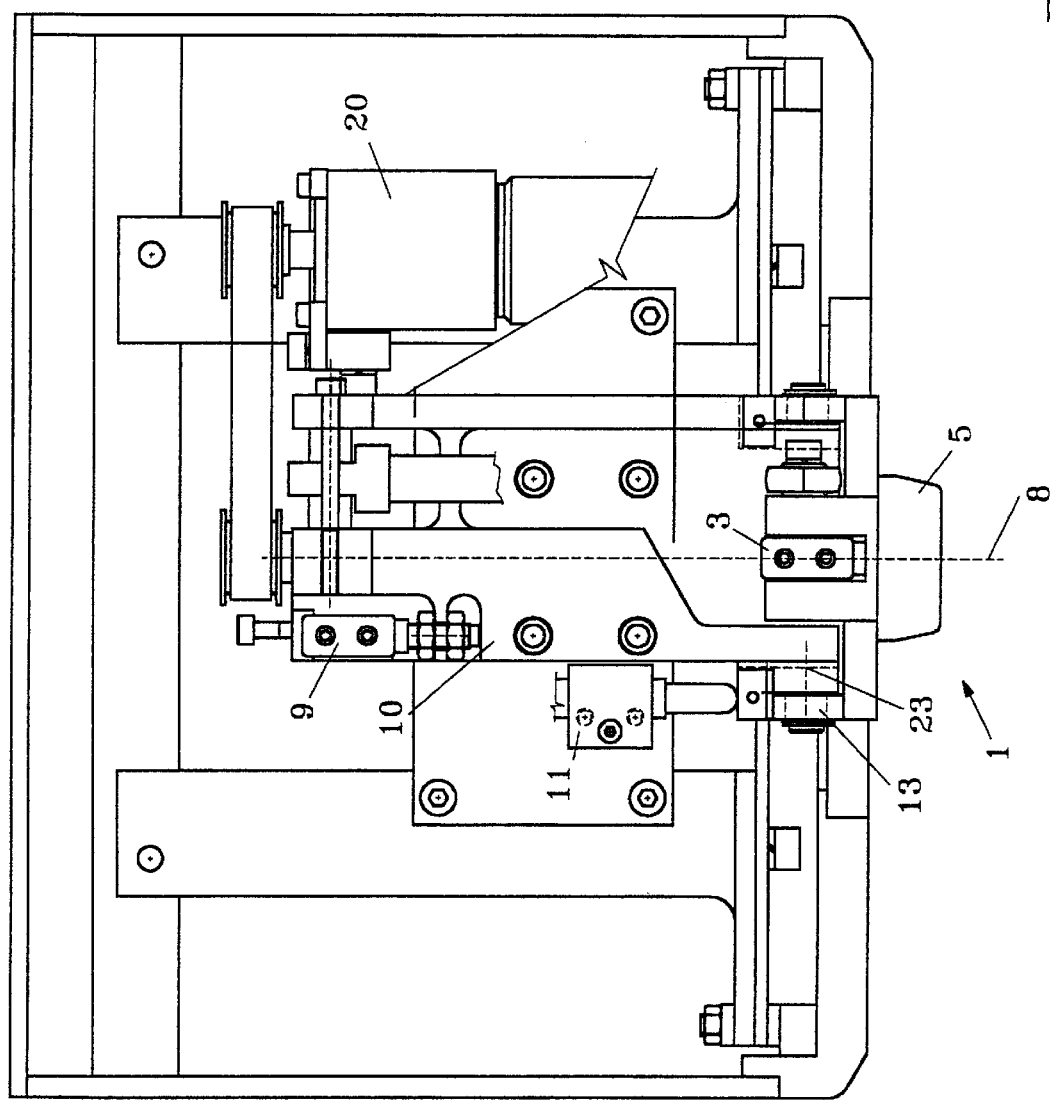
FIG. 1 is a front elevation in partial cross-section of a thickness gauge in accordance with one embodiment of the invention.

With reference to the annexed drawings, reference number 1 (see FIGS. 4 and 5) indicates the thickness gauge. The thickness gauge 1 for first non-contact measuring means 3, designed to measure the distance to a first or upper face 2 of a non-metallic material 4 present in the form of film, foil, tape or on the flattened form, and second non-contact measuring means 5, designed to measure the distance to an upper metal reference surface 6.

First and second measuring means 3 and 5 are both positioned above the upper face 2 of material 4, and function coaxially so that the measurements relate to the same measuring axis 8.

Figure 4:
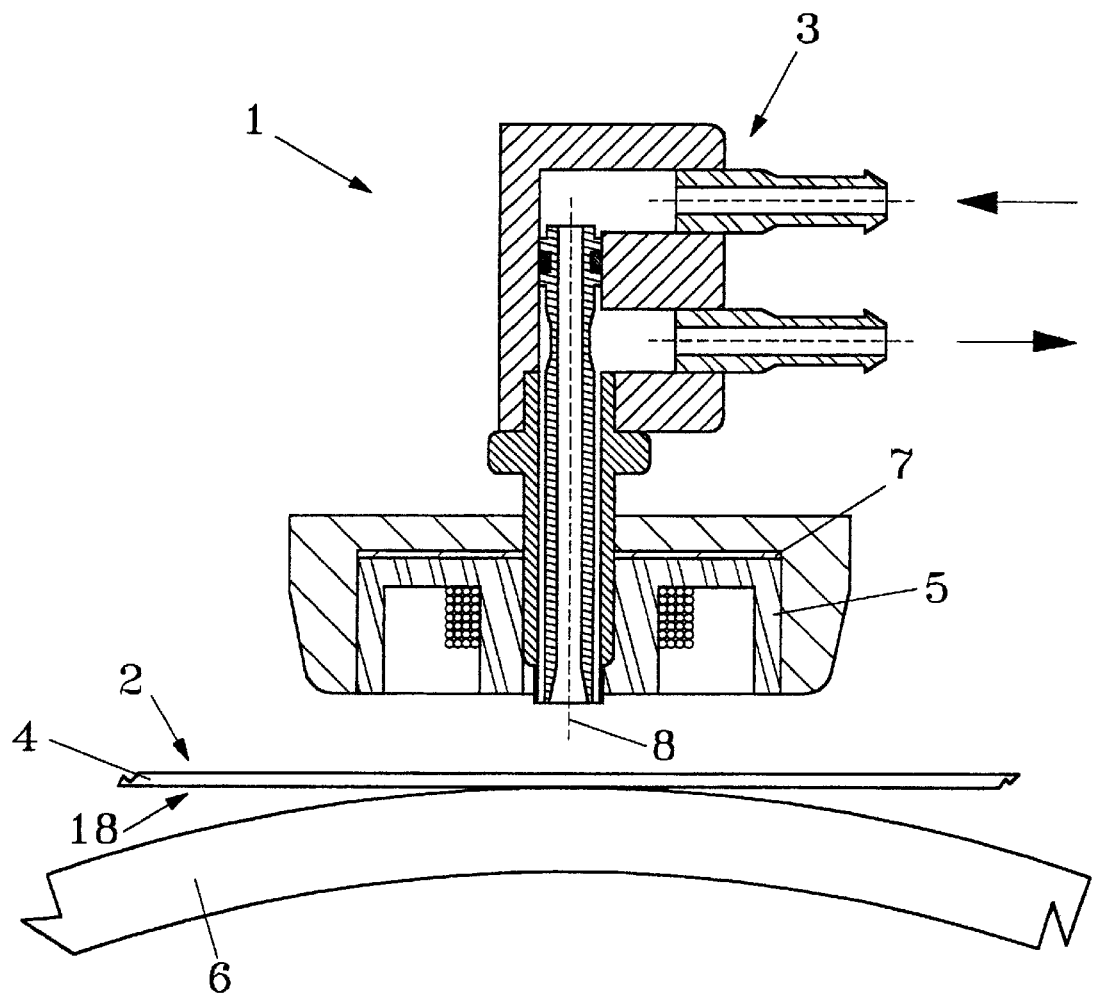
FIG. 4 is a cross-sectional view of a detail of the thickness gauge in accordance with another embodiment of the invention.

In accordance with a first embodiment, as seen in FIG. 4, film 4 moves in contact with metal reference surface 6, ie. metal reference surface 6 coincides with the second or lower face 18 of film 4.

To reduce friction between film 4 and the reference surface 6, surface 6 can be a rotating surface.

A characteristic of the thickness gauge 1 is that first means 3 consist of a backscattering fluid sensor.

The purpose of a backscattering fluid sensor is to detect the pressure induced inside a detecting duct 35 due to an air flow coming from the outlet 36 and reflected from the surface 2 to be measured.

In fact, the pressure induced in the detecting duct 35 is a function of the distance between the outlet duct 36 and the surface to be measured.

According to a preferred embodiment, the air flow coming from the outlet duct 36 has a pressure of about 250 mBAR, while the pressure induced in the detecting duct 35 can be up to 70 mBAR.

Fluid sensors of this type, normally used to detect the presence of objects, are known, and are therefore not further described.

The use of backscattering fluid sensors allows the construction of a gauge designed to measure the distance to the upper surface 2 of material 4 which is unaffected by the optical characteristics of material 4.

Backscattering fluid sensors present very low radial dimensions which are smaller than those of an optical sensor (approximately 5 mm in diameter). This allows the use of second measuring systems 5 with smaller radial dimensions than those normally used, and which therefore provide more precise measurements.

Backscattering fluid sensors also present a higher level of accuracy than optical sensors, typically around 1.5 mm/mbar.

It should be noted that the backscattering fluid sensor presents a relatively large measurement spot (typically a circle of about 5 mm in diameter). This area is considerably larger than the spot a laser distance gauge measures (typically an ellipse of about 0.3 mm×1 mm).

This characteristic can be advantageously used when the sheet 4 presents surface profile that is extremely irregular (e.g. in the case of non wowen materials) as the measurement obtained represents an average value which is after all the most important information.

Typically, when materials 4 of this type are measured immediately following their exit from a production line, their temperature is often much higher than ambient temperature.

This heat emission can affect the permeability of the inductance in inductive sensor 5, thus producing measuring errors.

For this purpose, a preferred embodiment includes means 7, designed to maintain inductive sensor 5 at a constant temperature.

In accordance with this embodiment, the means 7 has an electrical resistor controlled by an electronic temperature regulation device.

In an alternative embodiment, the means 7 is a thermistor.

The reliability of the readings of first means 3 depends (inter alia) on the quality of the power source.

Any variations in input pressure, even of very short duration and relatively modest value, can make the readings of fluid reference sensor 3 unreliable.

For these reasons, means 9, designed to differentiate between the part of the global signal emitted by first means 3 which is due to variations in the profile of surface 2, and the part due to disturbances in the power source of first means 3, can be installed.

Figure 2:
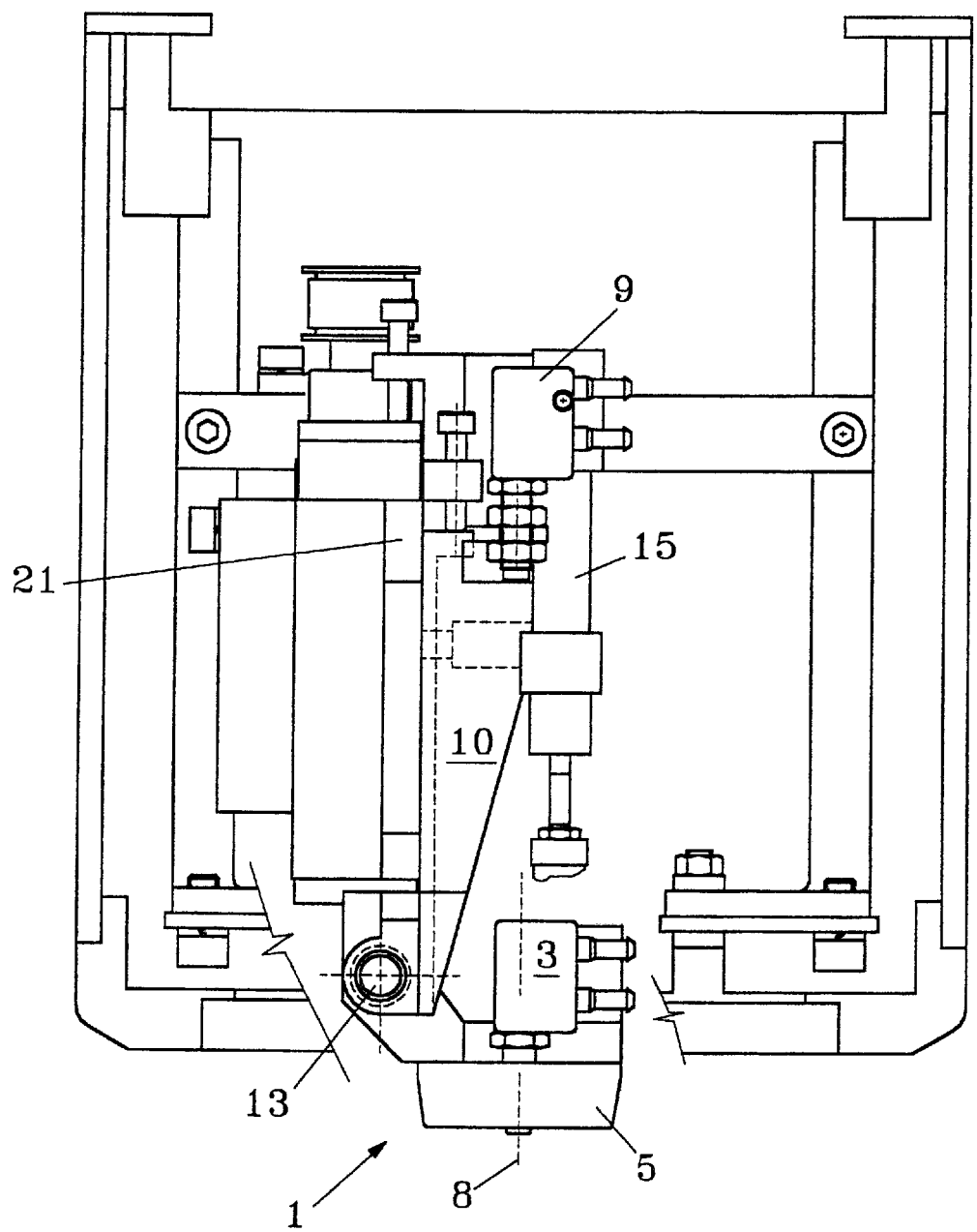
FIG. 2 is a side elevation in partial cross-section of the device shown in FIG. 1.

In one embodiment, the means 9 comprises a second backscattering fluid sensor or fluid reference sensor 9 (FIG. 2), powered by the same source as first backscattering fluid sensor 3, which measures a constant preset distance, e.g. a distance equal (or roughly equal) to the mean value of the measuring range in which first fluid sensor 3 operates.

As reference sensor 9 measures a constant distance, any variation detected by it is obviously attributable to disturbances in the power source.

Figure 7:
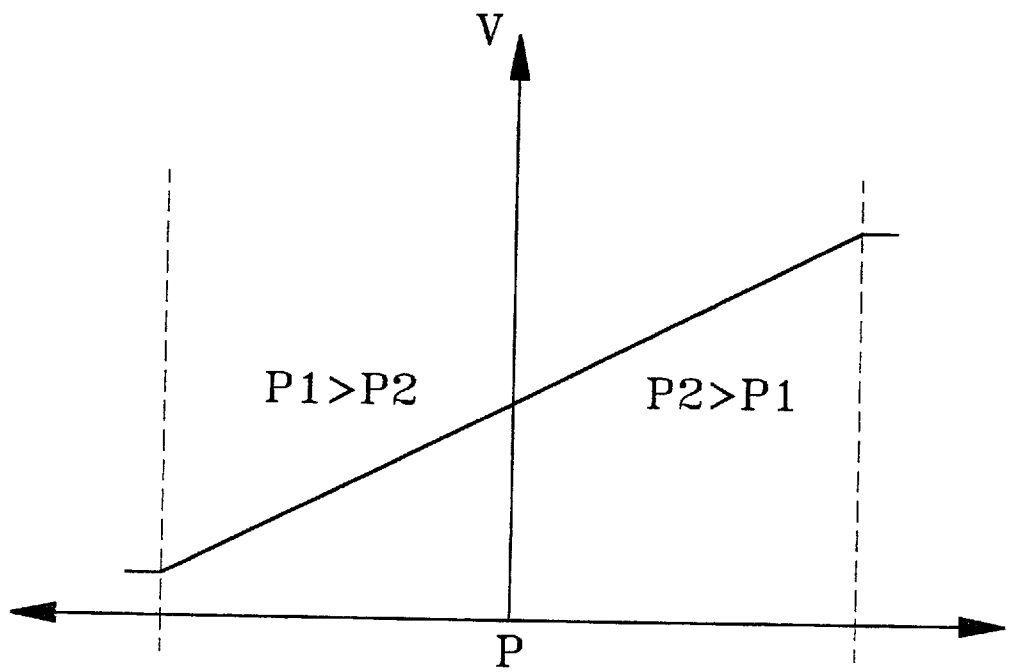
FIG. 7 is a diagram showing the curve of a pressure differential amplifier used in an embodiment of the gauge of the invention.

If the difference between the signals of sensor 3 and reference sensor 9 is calculated, e.g. by means of a pressure differential amplifier (FIG. 7) a signal practically free of power source is obtained until the signals are substantially the same value, that is until the error components have approximately the same values. According to a different embodiment, means 9 comprises two reference backscattering fluid sensors powered by the same source powering the backscattering fluid sensor 3.

In this case, the two reference sensors 9 measure two distinct constant values, for example two intermediate distances in the sensor measuring range.

Again since the distances measured by said two reference sensors 9 are constant, any variation detected by them is obviously attributable to disturbances in the power source.

A primary advantage to using two reference sensor (9) is that it is possible to achieve a good error suppression through all the measuring range.

Figure 6:
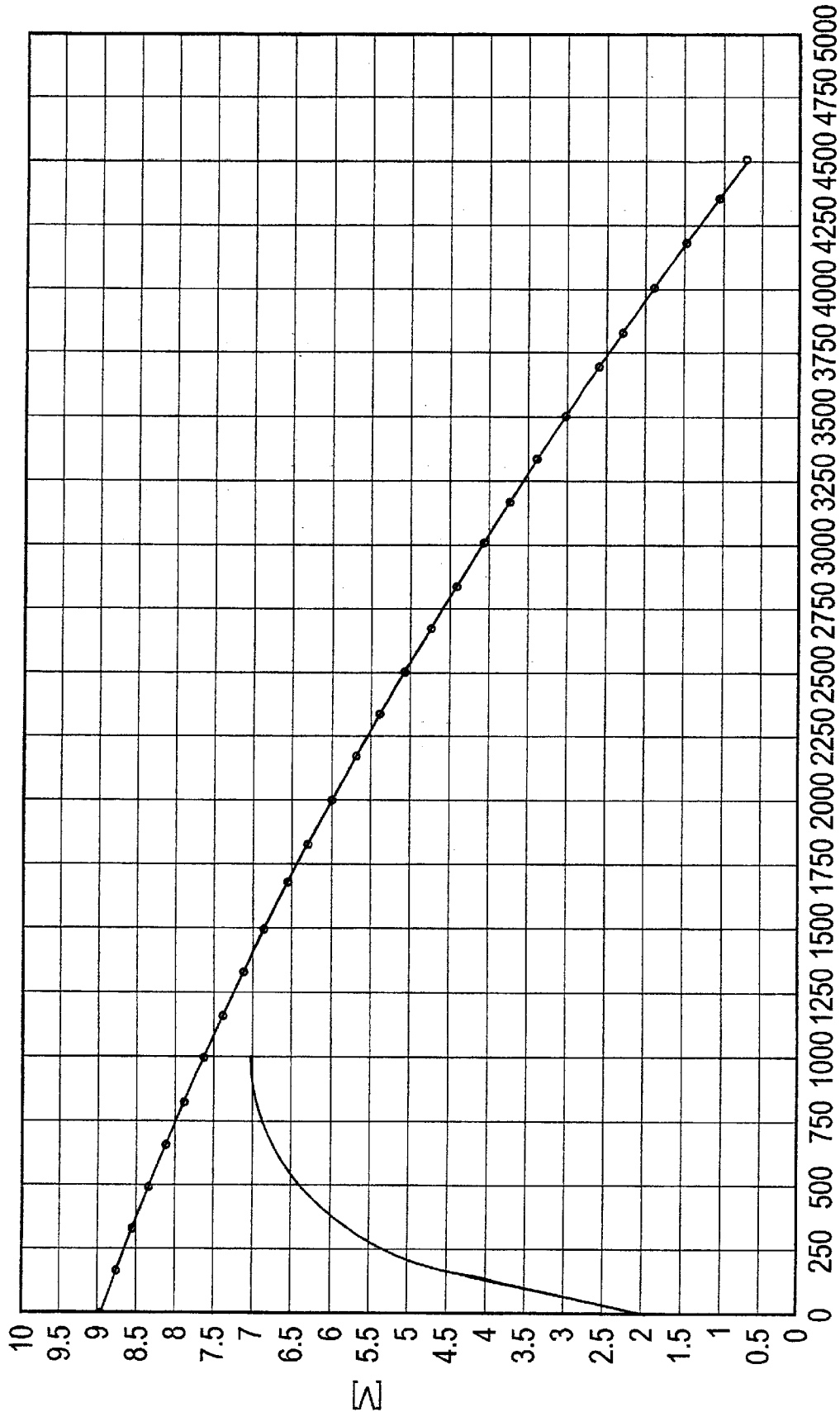
FIG. 6 is a diagram showing the output curves of a backscattering fluid sensor used with in the gauge of the invention.

While an inductive sensor presents a relatively wide measuring range (in practice from approx. 0 to 8 mm), backscattering fluid sensors present a far narrower measuring range (in practice from approx. 0.1 to 1 mm) (FIG. 6 line with little circles).

In order to increase the range of use of the gauge of the invention up to the limits allowed by inductive sensor 5, fluid sensor 3 can be made to move along measuring axis 8.

Figure 3:
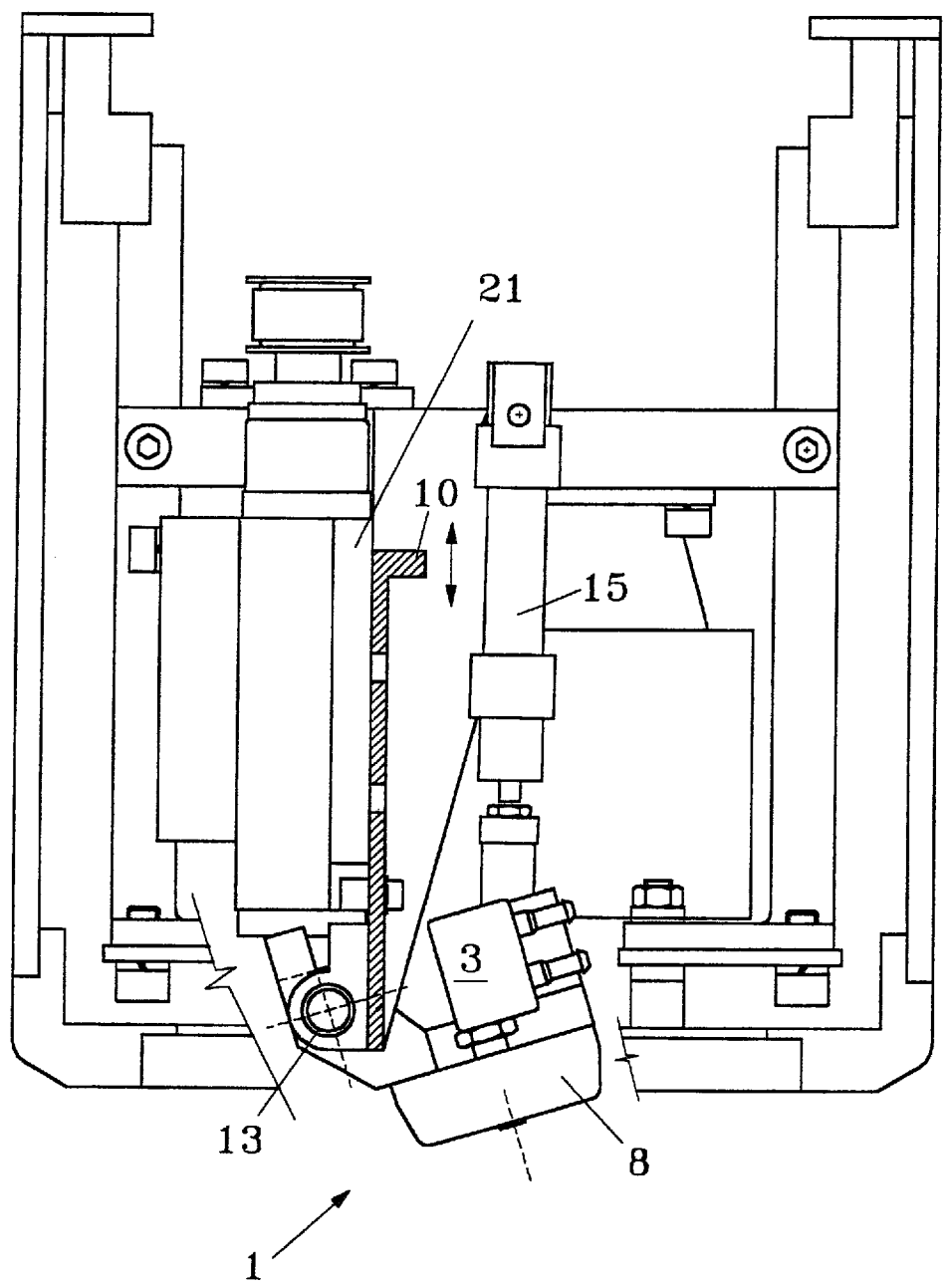
FIG. 3 is the same view as in FIG. 2, showing the thickness gauge mechanically de-activated.

In one embodiment, sensors 3 and 5 are both mobile, and for this purpose are both coupled to a slide 10 which runs on straight tracks 21 (shown in FIG. 3), along measuring axis 8.

Slide 10 can be driven by suitable motor systems 20, such as a direct-current motor or a step motor, which transmits motion to the slide 10 via a suitable mechanical drive such as a recirculating-ball screw.

The possibility of adjusting the position of first and second means 3 and 5, allows the use of the gauge in object with a wide range of thicknesses.

A position detector or transducer 11 is provided for knowing the position of gauge 1.

According to the preferred embodiment, the presence of the means for moving the first and second measuring means 3 and 5 can be suitably used for performing the calibration of sensor 3 and 5 even when they are fitted on the machine.

In other words the sensor 3 and 5 are moved along the measurement axis 8 and their measurements are compared with the measurement of detector 11.

The measuring surface can be, for example, the metal reference surface 6.

It should be noted that the calibration method does not require means for moving the measured surface.

Since the precision of the calibration thus effected depends primarily on the precision of detector or transducer 11, it is necessary to select the said detector or transducer 11 with particular care.

In accordance with a preferred form of construction, transducer 11, is an absolute position transducer, such as the type comprising an electric transformer with axially mobile core which supplies output voltage proportional to the position of the core. These transducers are commonly known as LVDT's (Linear Variable-Differential Transformers).

In order to eliminate the presence of moving mechanical parts which can be a source of malfunctions in the long run, an optical device can be used to make detector 11.

According to an alternative form of construction, transducer 11 can be an incremental position transducer, such as an electronic revolution counter (also known as an encoder) which counts the revolutions of motor 20.

In this case, the current vertical position of thickness gauge 1 is the algebraic sum of the movements previously performed.

It is obviously possible to use any other position transducer which provides an acceptable degree of precision.

In accordance with the annexed drawings, thickness gauge 1 oscillates around an axis 23 which is basically parallel to the plane of the material to be measured 4, and perpendicular to the direction of movement of material 4.

This latter system is preferable, as it enables thickness gauge 1 to be retracted rapidly from material 4 in case of slipping or contact between material 4 and gauge 1. This prevents possible damage to gauge 1. For this purpose, thickness gauge 1 can be connected to slide 10 via a first hinge 13, and to a linear actuator 15 via a second hinge (not shown).

In a preferred form of use, thickness gauge 1 is immobile along axis 8 during measurement of the material.

If the material presents a thickness profile with high variations, basically of the same magnitude as the measuring range of fluid sensor 3, it is preferable (and may even be necessary) for thickness gauge 1 to move in the direction of axis 8, continually compensating for variations in the thickness of the material, so that the distance of gauge 1 from upper surface 2 of the material remains costant.

For this purpose, a suitable electronic circuit of known type is installed to compensate for variations in distance between thickness gauge 1 and upper surface 2 of material 4. This circuit detects the variation in distance (or error) between thickness gauge 1 and upper surface 2 of material 4 at first preset intervals, and controls electronic motor 20 at second preset intervals to compensate for variations in distance between gauge 1 and upper surface 2.

The position regulation of thickness gauge 1 can be the proportional (P), proportional-plus-derivative (PD) or proportional-plus-derivative-plus-integral (PID) type.

Figure 5:
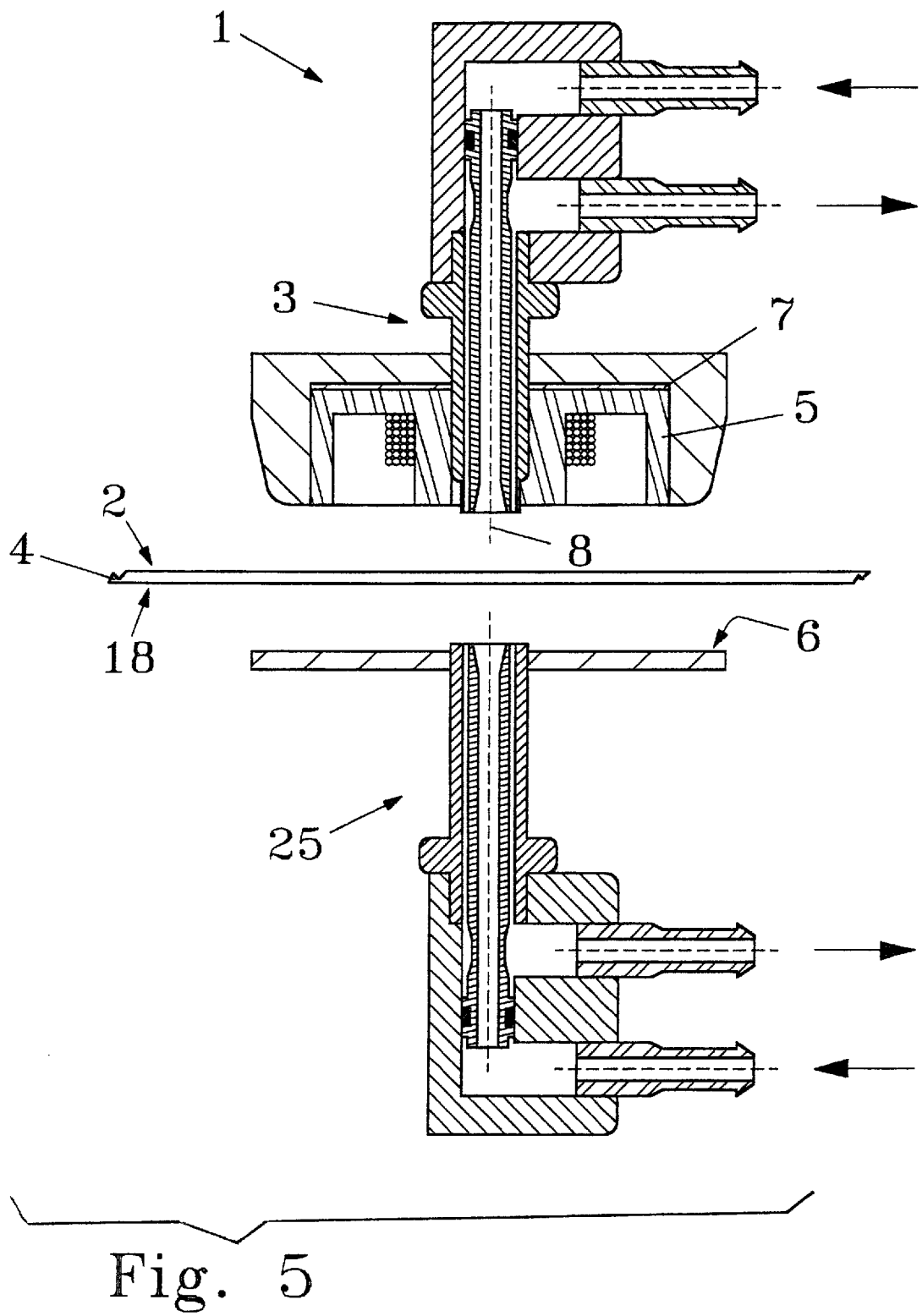
FIG. 5 is the same view as in FIG. 4, showing an alternative embodiment of the invention.

FIG. 5 shows an alternative form of construction of the invention which is preferable when, in view of the low flexibility or adherence of material 4, lower surface 18 is not in constant contact with metal reference surface 6.

In this case, film 4 is maintained at a distance from reference surface 6, and third non-contact measuring systems 25, integral with the said reference surface 6, are installed to measure the distance between lower surface 18 and reference surface 6.

For the reasons explained above, the said third systems 25 are constituted by a backscattering fluid sensor.

In another embodiment, metal reference surface 6 and third sensor 25 are designed to move along measuring axis 8, driven by motor systems for example, like the motor systems used to move sensor 3 and 5.

A second position transducer or detector could also be installed (not shown) associated with the said third sensor 25.

The measurements taken by fluid sensor 25 can be corrected by comparing them with the measurements taken by one or more fluid reference sensors as already explained.

For calibrating the gauge 1 a device (not shown) for allocating a reference metallic surface in a known position along the measurement axis 8 could be provided.

What is claimed is:

1. A thickness gauge for measuring a thickness of a non-metallic material formed as a film, foil or tape having first and second surfaces, the gauge comprising:
    a support which moves in a direction substantially orthogonal to the first and second surfaces of the non-metallic material being measured;
    a metal surface in contact with the second surface of the non-metallic material;
    a first sensor mounted on the support, the first sensor measuring a first distance to the first surface of the non-metallic material;
    a second sensor mounted on the support, the second sensor measuring a second distance to the metal surface;
    a linear transducer connected to the support, the linear transducer micrometrically determining the position of the support relative to the non-metallic material; and
    means for receiving the first and second distances and calculating the difference between the first and second distances to determine the thickness of the non-metallic material.

2. A thickness gauge according to claim 1, wherein the first sensor is a backscattering fluid sensor.

3. A thickness gauge according to claim 2, wherein the second sensor is an inductive sensor.

4. A thickness gauge according to claim 3, wherein the backscattering fluid sensor is an air sensor.

5. A thickness gauge according to claim 4, wherein the metal surface is formed by a rotating metallic cylinder.

6. A thickness gauge according to claim 2, wherein the backscattering fluid sensor is an air sensor.

7. A thickness gauge according to claim 1, wherein the second sensor is an inductive sensor.

8. A thickness gauge according to claim 7, wherein the metal surface is formed by a rotating metallic cylinder.

9. A thickness gauge according claim 1, wherein the metal surface is formed by a rotating metallic cylinder.

10. A thickness gauge according claim 1, further comprising temperature means for maintaining a constant temperature for the inductive sensor.

11. A thickness gauge according claim 10, wherein the temperature means comprises a resistor located in proximity to the inductive sensor and a temperature regulator.

12. A thickness gauge according claim 1, wherein at least one of the first and second sensors are pivotable around an axis parallel to the first and second surfaces of the non-metallic material and perpendicular to the direction of movement.

13. A thickness gauge according claim 1, further comprising compensating means for compensating for measuring errors in the first sensor.

14. A thickness gauge according claim 13, wherein the compensating means comprises at least one reference sensor having a common power source connection with the first sensor, the at least one reference sensor measuring a constant distance to generate at least one reference signal, and comparing means for comparing and calculating a reference difference between an output signal of the first sensor and each at least one reference signal.

15. A method for measuring the thickness of a non-metallic material in the form of a film, foil or tape, the method comprising:

providing first and second non-contact sensors in a coaxial configuration opposite a metallic reference surface to form a measuring region;

inserting the non-metallic material into the measuring region such that a bottom surface of the non-metallic material is in contact with the metallic reference surface;

measuring a first distance to the non-metallic material with the first sensor;

measuring a second distance to the metallic reference surface;

measuring a constant reference distance with a reference sensor connected to a common power source with the first sensor;

determining the thickness of the non-metallic material using the first and second distances; and compensating for power source disturbances using an output signal from the first sensor and a reference signal from the reference sensor.

16. A method according to claim 15, further comprising making at least one second reference measurement with at least one second reference sensor connected to the common power source and using at least one second reference signal from the second reference sensor to compensate for power source disturbances.

17. A method of calibrating a thickness gauge for measuring a thickness of a non-metallic material formed as a film, foil or tape having first and second surfaces, the gauge comprising a support which moves in a direction substantially orthogonal to the first and second surfaces of the non-metallic material being measured; a metal surface in contact with the second surface of the non-metallic material, a first sensor mounted on the support, the first sensor measuring a first distance to the first surface of the non-metallic material, a second sensor mounted on the support, the second sensor measuring a second distance to the metal surface, a linear transducer connected to the support, the linear transducer micrometrically determining the position of the support relative to the non-metallic material, and means for receiving the first and second distances and calculating the difference between the first and second distances to determine the thickness of the non-metallic material, the calibration method comprising:

measuring the distance to a common reference surface with the first and second sensors at an initial position of the support detected by the linear transducer;

measuring the distance to the common reference surface with the first and second sensors at a second position of the support;

repeating measuring the distance to the common reference surface at additional positions of the support a predetermined number of times;

storing output signals from the first and second sensors associated with the position of the support in a memory; and linearizing curves generated from the output signals of te first and second sensors stored in memory as a function of the position of the support.

* * * * *